United States Patent
Jergess

(10) Patent No.: US 10,041,286 B2
(45) Date of Patent: Aug. 7, 2018

(54) METHOD OF CONTROLLING A MOVABLE CLOSURE MEMBER OF A VEHICLE

(71) Applicant: FORD GLOBAL TECHNOLOGIES, LLC, Dearborn, MI (US)

(72) Inventor: Rafic Jergess, Warren, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/064,291

(22) Filed: Mar. 8, 2016

(65) Prior Publication Data

US 2017/0260795 A1    Sep. 14, 2017

(51) Int. Cl.
*E05F 15/632*    (2015.01)
*B60R 16/03*    (2006.01)

(52) U.S. Cl.
CPC ............ *E05F 15/632* (2015.01); *B60R 16/03* (2013.01); *E05Y 2400/30* (2013.01); *E05Y 2400/45* (2013.01); *E05Y 2900/531* (2013.01)

(58) Field of Classification Search
CPC .... E05F 15/632; B60R 16/03; E05Y 2400/30; E05Y 2400/45; E05Y 2900/531
See application file for complete search history.

(56) References Cited

U.S. PATENT DOCUMENTS 5,274,351 A * 12/1993 Lee .................... B60H 1/00828
                                                                    338/221
5,801,501 A    9/1998 Redelberger
6,633,094 B1 * 10/2003 Andou .................... E05F 5/003
                                                                    307/326
7,023,161 B2    4/2006 Iwasaki et al.
7,576,502 B2    8/2009 Pedemas et al.
7,605,554 B2    10/2009 Kunkel

FOREIGN PATENT DOCUMENTS

DE            3736400 A1    5/1989
JP      2007218002 A    8/2007

OTHER PUBLICATIONS

English Machine Translation of JP2007218002.
English Machine Translation of DE3736400.

\* cited by examiner

*Primary Examiner* — Michael D Lang
(74) *Attorney, Agent, or Firm* — Jason Rogers; King & Schickli, PLLC

(57) ABSTRACT

A method of controlling a movable closure member of a vehicle is provided. The method includes the steps of: determining an initial position of the movable closure member; initiating movement of the movable closure member; and switching power between a first shunt and a second shunt when the movable closure member is at an intermediate position between the initial position and a final position of the movable closure member. The shunt may be traces on a printed circuit board. Within the method, the initiating step may include switching power to the first shunt when the initial position of the movable closure member is determined to be a closed position, and switching power from the first shunt to the second shunt when the movable closure member is at an intermediate position. The movable closure member may be a side door window, a rear gate window, a power sliding door, a sunroof, or a moon roof.

14 Claims, 7 Drawing Sheets

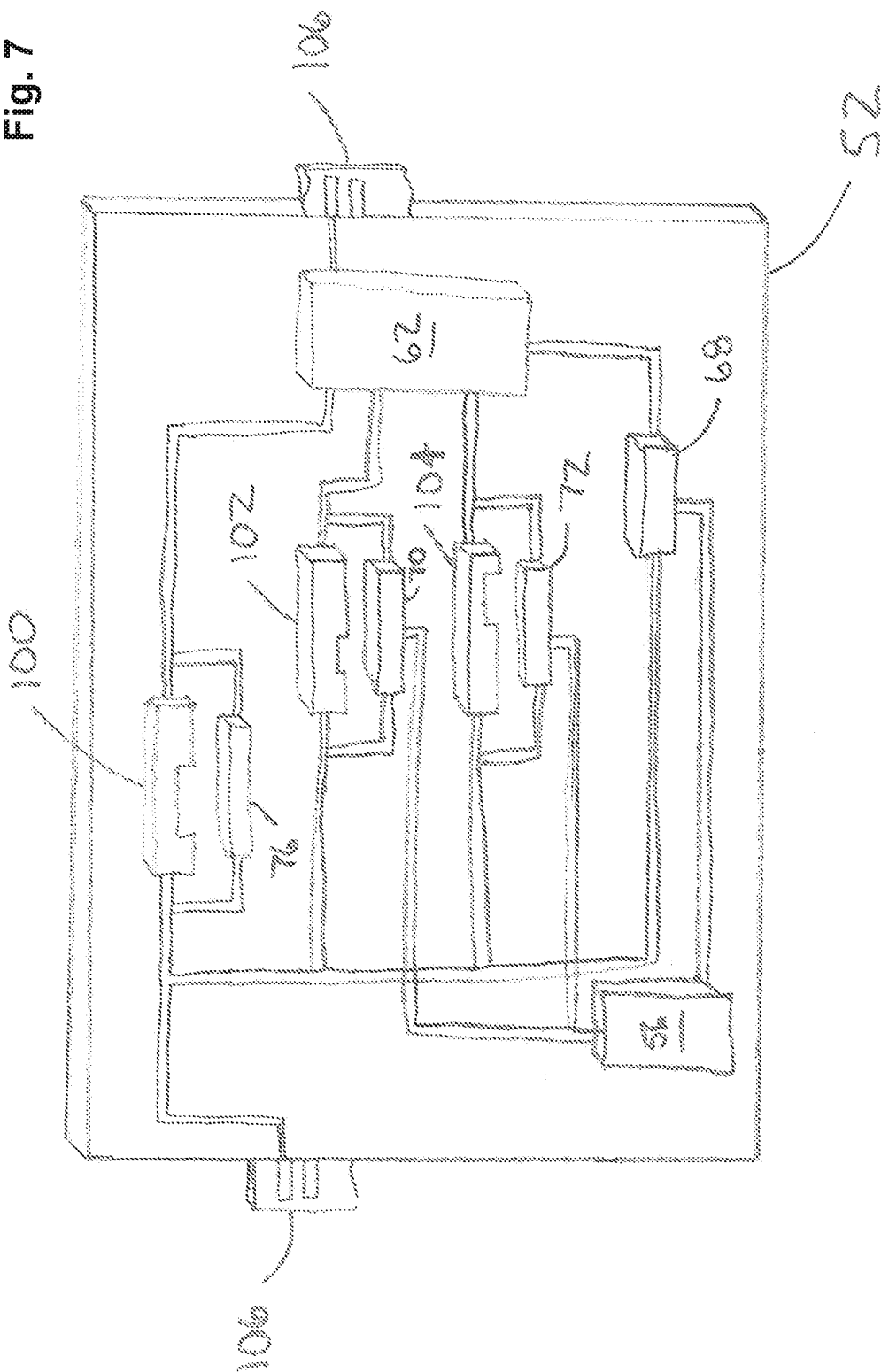

METHOD OF CONTROLLING A MOVABLE CLOSURE MEMBER OF A VEHICLE

TECHNICAL FIELD

This document relates generally to movable closure members of a vehicle, and more specifically to a method of controlling the movable closure members.

BACKGROUND

Vehicles may include a variety of movable closure members including, for example, side windows, rear lift gate windows, power sliding doors, sunroofs, and moon roofs. Utilization of these movable closure members in the normal course of operation of a vehicle can create pinch points adjacent a closed position. It is known in the industry that reducing a speed of travel or movement of movable closure members adjacent the closed position can minimize the effects of such pinch points in the event there is an obstruction during a closing procedure. In fact, vehicle safety standards regulate the amount of force that can be applied to obstructing objects in such scenarios.

One method of controlling the speed of movable closure members common within the industry utilizes pulse width modulation. Pulse width modulation speed control works by driving the motor with a series of "ON-OFF" pulses and varying the duty cycle, i.e., the fraction of time that the output voltage is "ON" compared to when it is "OFF," of the pulses while keeping the frequency constant. The power applied to drive the motor is controlled by varying the width of these applied pulses and thereby varying the average DC voltage applied to the motor terminals. By changing or modulating the timing of these pulses the speed of the motor can be controlled, i.e., the longer the pulse is "ON," the faster the motor will rotate and likewise, the shorter the pulse is "ON" the slower the motor will rotate.

One significant drawback to the utilization of pulse width modulation is the creation of electromagnetic compatibility issues. In other words, use of pulse width modulation to control drive motors within the vehicle can create unintentional electromagnetic energy which can cause unwanted effects such as electromagnetic interference or even physical damage in other equipment in the vicinity of the motor. Even more, utilization of pulse width modulation can cause mechanical vibration in certain instances due to the start/stop of the motor. Accordingly, a need exists for a method and related circuits for controlling the speed of movable closure members without creating unwanted electromagnetic interference or electromagnetic compatibility issues. Such a system would move the movable closure members between initial and final positions while allowing for a speed of movement to be adjusted. The adjustments could be designed to overcome retarding forces of seals associated with the movable closure member or to comply with vehicle safety standards at pinch points adjacent a closed position. Ideally, the system would allow the vehicle to operate in full compliance with the relevant vehicle safety standards and would minimize, if not eliminate, any electromagnetic compatibility issues.

In addition, the control circuits could utilize one or more shunts to control motor speed. The shunts could be formed as traces on a printed circuit board having varying resistances. Utilization of traces reduces the space required on the printed circuit board, the number of components utilized, overall cost, the number of component failures, and the overall complexity of the printed circuit board and the overall system by reducing the amount of control software required to provide varying motor speeds. Even more, the utilization of shunts eliminates the need for pulse width modulation control.

SUMMARY OF THE INVENTION

In accordance with the purposes and benefits described herein, a method is provided of controlling a movable closure member of a vehicle. The method may be broadly described as comprising the steps of: determining an initial position of the movable closure member; initiating movement of the movable closure member; and switching power between a first shunt and a second shunt when the movable closure member is at an intermediate position between the initial position and a final position of the movable closure member.

In one possible embodiment, the first shunt and the second shunt are a first trace and a second trace on a printed circuit board.

In another possible embodiment, the initiating step includes switching power to the first shunt or the second shunt depending on the initial position of the movable closure member.

In still another possible embodiment, the initiating step includes initially switching power to the first shunt when the initial position of the movable closure member is determined to be a closed position. In yet another, the switching step includes switching power from the first shunt to the second shunt when the movable closure member is at the intermediate position.

In one other possible embodiment, the initiating step includes switching power to the second shunt when the initial position of the movable closure member is determined to be an open position. In yet another, the switching step includes switching power from the second shunt to the first shunt when the movable closure member is at the intermediate position.

In yet still other embodiments, the movable closure member is a side door window, a rear gate window, a power sliding door, a sunroof, or a moon roof.

In accordance with a second aspect of the invention, a method is provided of controlling a movable closure member of a vehicle, comprising the steps of initiating movement of the movable closure member from an initial position to a final position, and switching power between a first shunt and a second shunt at a first intermediate position between the initial position and the final position of the movable closure member.

In another possible embodiment, the method further includes the step of switching power between the second shunt and a third shunt at a second intermediate position between the first intermediate position and the final position.

In yet another possible embodiment, the first shunt, the second shunt, and the third shunt are a first trace, a second trace, and a third trace on a printed circuit board.

In still another possible embodiment, the second intermediate position is adjacent the final position and the step of switching power between the second shunt and the third shunt at the second intermediate position slows the movement of the movable closure member to provide a sufficient period of time to reverse the movement of the movable closure member in the event of contact between the movable closure member and an object positioned within a path of the movable closure member between the second intermediate position and the final position.

In another possible embodiment, a circuit for controlling a movable closure member of a vehicle may be broadly described as comprising a motor for driving the movable closure member between an initial position and a final position, a first shunt having a first resistance, a second shunt having a second resistance, a relay for switching power from said first shunt and said second shunt to said motor, and a control module connected to said relay for energizing said relay and directing power from said first shunt and said second shunt to said motor dependent upon a position of the movable closure member.

In still another possible embodiment, the circuit for controlling the movable closure member of the vehicle further includes a first switch connected in parallel with said first shunt and a second switch connected in parallel with said second shunt, and wherein said control module is connected to said first switch and said second switch to direct power through said first shunt and said second shunt depending upon the position of the movable closure member. In yet another embodiment, the first switch and said second switch are power semiconductor devices.

In yet still another possible embodiment, the first shunt and said second shunt are traces on a printed circuit board and said first shunt has a first resistance and said second shunt has a second resistance different from the first resistance.

In one other possible embodiment, the circuit for controlling the movable closure member of the vehicle further includes a first switch connected in parallel with said first shunt and a second switch connected in parallel with said second shunt, and the control module is connected to said first switch and said second switch to selectively direct power through said first shunt and said second shunt depending upon the position of the movable closure member.

In another possible embodiment, the control module selectively directs power through said first shunt when the initial position of the movable closure member is a closed position, and the control module redirects power from the first shunt through said second shunt when the movable closure member is at an intermediate position.

In still another possible embodiment, the control module selectively directs power through said second shunt when the initial position of the movable closure member is an open position, and the control module redirects power from the second shunt through said first shunt when the movable closure member is at an intermediate position.

In other possible embodiments, the circuits for controlling a movable closure member of a vehicle described above are incorporated into a vehicle.

In the following description, there are shown and described several embodiments of a method of controlling a movable closure member of a vehicle and related circuits. As it should be realized, the methods and circuits are capable of other, different embodiments and their several details are capable of modification in various, obvious aspects all without departing from the methods and assemblies as set forth and described in the following claims. Accordingly, the drawings and descriptions should be regarded as illustrative in nature and not as restrictive.

BRIEF DESCRIPTION OF THE DRAWING FIGURES

The accompanying drawing figures incorporated herein and forming a part of the specification, illustrate several aspects of the vehicle, circuits, and method and together with the description serve to explain certain principles thereof. In the drawing figures:

FIG. 7 is a front perspective view of an exemplary printed circuit board having first, second and third traces.

Reference will now be made in detail to the present preferred embodiments of the method of controlling a movable closure member of a vehicle and related circuits, examples of which are illustrated in the accompanying drawing figures, wherein like numerals are used to represent like elements.

DETAILED DESCRIPTION

Figure 1:
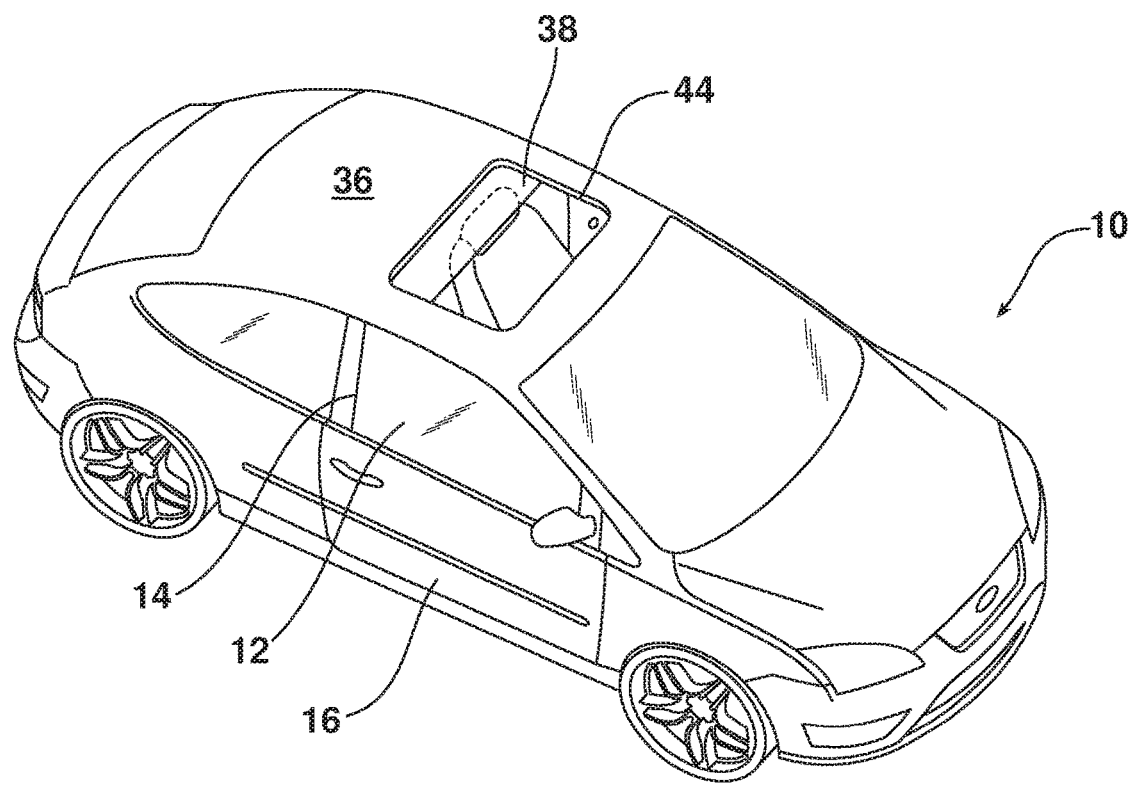
FIG. 1 is an exemplary illustration of a vehicle in perspective view.

Reference is now made to FIG. 1, an automotive passenger vehicle 10 is generally illustrated equipped with various movable closure members. The vehicle 10 is generally shown as a passenger vehicle having a body that includes powered movable closure members. The powered movable closure members include, for example, a side door window 12 that moves between open and closed positions within an opening 14 in the side door 16 of the vehicle 10. Other exemplary movable closure members may include a rear gate window in sport utility vehicles, power sliding doors in minivans, a sunroof, or a moon roof.

As should be evident to those skilled in the art, the side window 12 may be actuated responsive to a user switch 18 via a door control unit 20 and may include an actuator 22, such as a motor, to move a mechanism 24 (shown in FIG. 2) supporting the side window 12 as is known in the art. The mechanism 24 positioned within the side door 16 generally supports the side window 12 and is actuated by the motor 22, in response to a door control unit 20, to move the side window up and down between an initial position and a final position with respect to the opening 14 in the side door as is known in the art. In the described embodiment, for example, the initial position may be a closed position wherein the side window 12 is fully raised and lodged against an upper portion 26 of a window seal 28 and the final position may be an open position wherein the side window is fully retracted into the side door 16. Alternatively, the initial and final positions may be intermediate positions between open and closed positions or a combination of open, closed and intermediate positions, and the door control unit/motor combination may be replaced by a smart motor having built in control capabilities as is known in the art.

Figure 2:
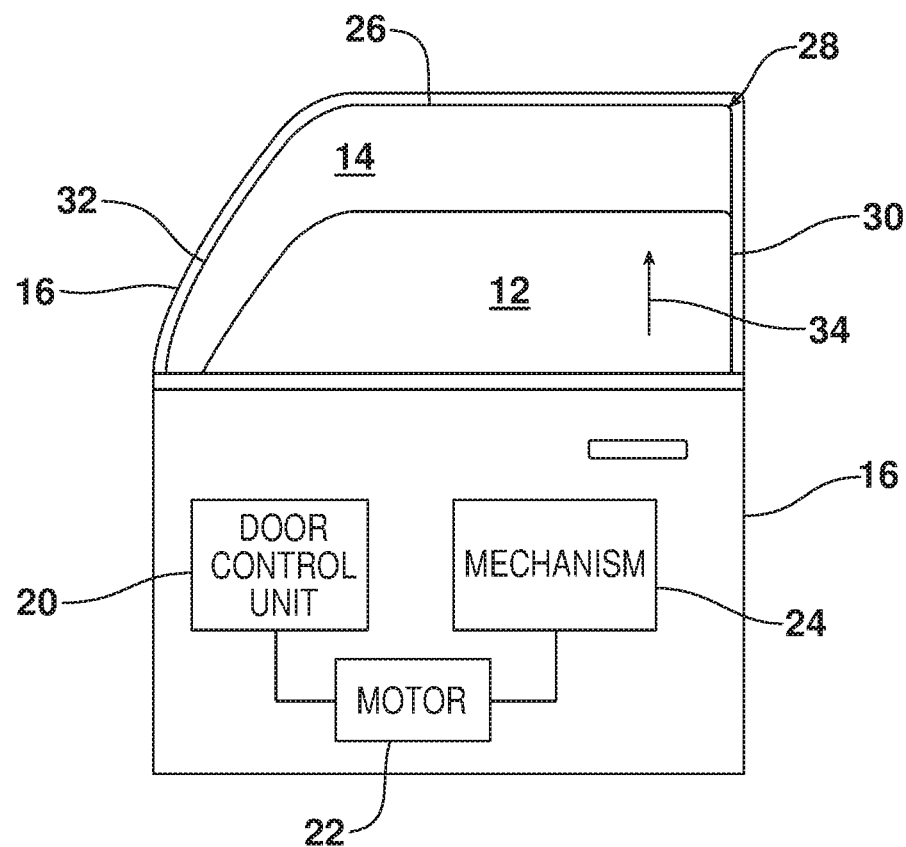
FIG. 2 is a side plan view of a vehicle side door and partially open side window.

As best shown in FIG. 2, the window seal 28 is provided between the side door window 12 and the side door 16 to seal the vehicle 10 when closed. In the figure, the side window 12 is shown moving (see action arrow 34) between the initial position wherein the side window is completely open toward the final position wherein the side window is completely closed. As it moves between the initial position and the final position, the side window 12 engages an increasing amount of the seal 28. This creates a retarding force against the movement of the side window 12 and causes the side window's movement to slow. Such retarding forces can also be created by the structure of the side door 16 as well, for example by hard points or sheet metal bends.

In order to overcome such retarding forces and to provide a more consistent movement of the side window 12, additional power may be provided to the motor 22 driving the side window at an intermediate position. In this manner, the visually noticeable slowing of the side window's movement may be reduced, if not eliminated altogether. Of course, varying the power provided to the motor 22 driving the side window 12 at more than one intermediate position would further reduce any visually noticeable slowing of the side window's movement.

Depending upon the door structure and the amount of seal engaged, the intermediate position can be any point between the initial position and the final position. In the side door 16 shown in FIG. 2, the side window 12 only engages a rear portion 30 of the seal 28 throughout a majority of its travel. A front portion 32 of the seal 28 is not engaged until the side window 12 is almost completely closed. Thus, the intermediate position shown by the side window 12 in FIG. 2 is close to the final position. In an alternate embodiment, the side window 12 may engage both a front portion 32 and a rear portion 30 of the seal 28 at the beginning of its travel. In such an arrangement, a greater retarding force against movement of the side window would be created at an earlier point in the movement dictating that the intermediate position be closer to the initial position.

In addition to maintaining a visually consistent movement, the power provided to the motor 22 driving the side window 12 may be reduced at an intermediate position adjacent or near the closed position to limit an amount of force applied to an object (e.g., a finger or hand) positioned within a path of movement of the side window. The intermediate position adjacent or near the closed position could be the first intermediate position where power provided to the motor 22 is varied or a second, or further, intermediate position. The purpose of slowing the movement of the side window as it approaches the closed position is to provide a sufficient period of time to stop and/or reverse the movement of the side window 12 in the event of contact between the side window and the object. In this manner, the force applied to the object before the stopping or reversing of the movement can be minimized at least in accordance with vehicle safety standards.

Although the movement shown in FIG. 2 and described above is between open and closed positions, the same logic applies when moving the side window 12 between closed and open positions. In such a scenario, the side window 12 engages a decreasing amount of the seal 28 throughout movement. This reduces the retarding force and causes the side window 12 to move faster as it approaches the open position. In order to overcome the initial retarding force, an initial amount of power provided to the motor 22 driving the side window 12 may be high. At an intermediate position between the initial position and the final position when less seal 28 is engaged, however, the power provided to the motor 22 is reduced to maintain the movement of the side window despite the lesser retarding force to provide a more consistent movement. In this manner, the visually noticeable increasing speed of the side window movement may be reduced, if not eliminated altogether. Of course, varying the power provided to the motor 22 driving the side window 12 at more than one intermediate position would further reduce any visually noticeable slowing of the side window movement.

The vehicle 10 shown in FIG. 1 also has a powered sunroof assembly located in the roof 36 of the vehicle body. The sunroof assembly includes a movable closure member 38 (shown partially open), such as a transparent glass window, which is commonly referred to as a moon roof. A sunroof is a retractable roof panel often made of the same material as the body of the vehicle that lets light or air into a vehicle. Sunroofs that are glass, or are otherwise see through or translucent, are typically referred to as moon roofs. For purposes of this invention, moon roofs are considered to be a subset of sunroofs. Similar to the side window 12, the sunroof 38 may be actuated responsive to a user switch (not shown) and may include an actuator, such as a motor 42, to move a mechanism 48 for moving the sunroof 38 as is known in the art. In the described embodiment shown in FIG. 3, the mechanism 48 is actuated by the motor 42 to move the sunroof 38 between an initial, or open, position and a final, or closed, position with respect to the opening 44 in the roof 36 as shown by action arrow 46. Even more, the motor 42 may be a smart motor having built in control capabilities in lieu of a sunroof control unit/module.

As with the side window 12, similar issues arise when opening and closing a sunroof 38. Although sunroofs do not typically utilize seals similar to those used in association with side windows, movement between initial and final positions may involve retarding forces. For example, a spring forming a part of the mechanism 48 attached to the sunroof 38 to support and facilitate movement creates a maximum resistance against a closing movement as the sunroof approaches the closed position. In order to overcome such a retarding force and to provide a more consistent movement of the sunroof 38 throughout movement, additional power may be provided to the motor 42 at an intermediate position between the initial and final positions. In this manner, the visually noticeable slowing of the sunroof movement may be reduced, if not eliminated altogether. Of course, varying the power provided to the motor 42 at more than one intermediate position would further reduce any visually noticeable slowing of the sunroof movement. Depending upon the mechanism utilized to move the sunroof, the intermediate position can be any point between the initial position and the final position.

In addition to maintaining a visually consistent movement, the power provided to the motor 42 may be reduced at an intermediate position adjacent or near a closed position in order to limit the amount of force applied to an object positioned within a path of the sunroof 38. This is the same concept utilized with regard to the side window 12 and applies equally to sliding side doors, lift gate windows, etc. Even more, depending on the mechanisms used to move the sunroof 38, its movement may require slowing as the closed position is neared. In this manner, there is a sufficient period of time to allow for proper movement of the sunroof, or a power sliding door, to effect closure and to stop or reverse the movement of the closure member in the event of contact between the closure member and an object. In this manner, the force applied to the object before the stopping or reversing of the movement can be minimized at least in accordance with vehicle safety standards.

Figure 3:
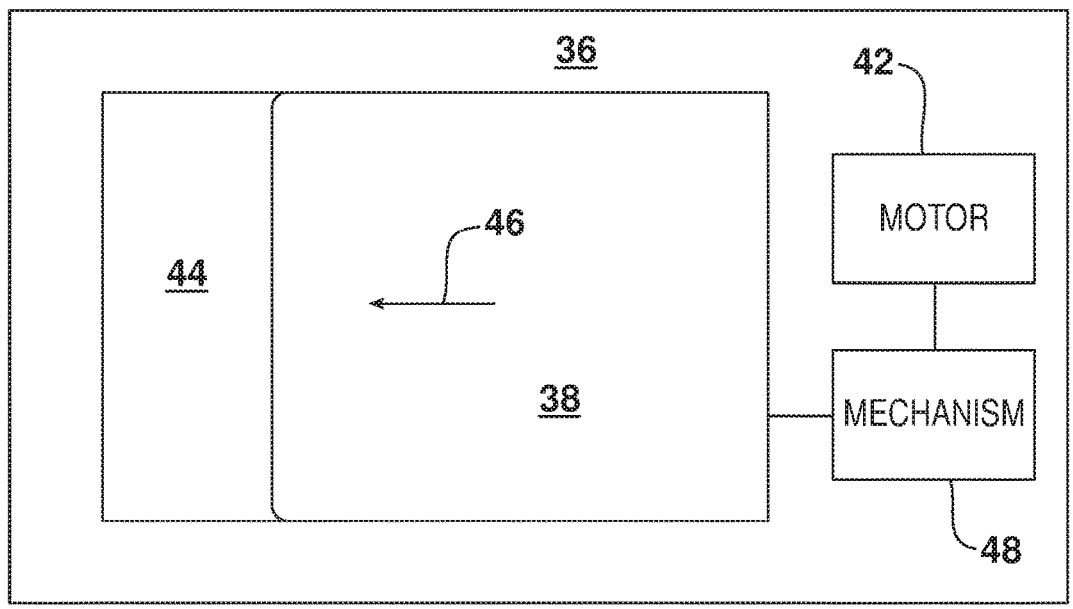
FIG. 3 is a top plan view of a vehicle roof and partially open moonroof.

Although the movement shown in FIG. 3 and described above is between open and closed positions, the same logic applies when moving the sunroof 38 between closed and open positions. In such a scenario, the force applied to the sunroof 38 decreases throughout the movement. This causes the sunroof 38 to move faster as it approaches the open position. In order to accommodate the initial force when opening, an initial amount of power provided to the motor 42 driving the sunroof 38 may be low. At an intermediate position between the initial position and the final position when less force is applied, however, the power provided to the motor 42 is increased to speed the movement of the sunroof to provide a more consistent movement. In this manner, the visually noticeable decreasing speed of the sunroof may be reduced, if not eliminated altogether. Of course, varying the power provided to the motor 42 driving the sunroof 38 at more than one intermediate position would further reduce any visually noticeable change of speed of the sunroof.

Figure 4:
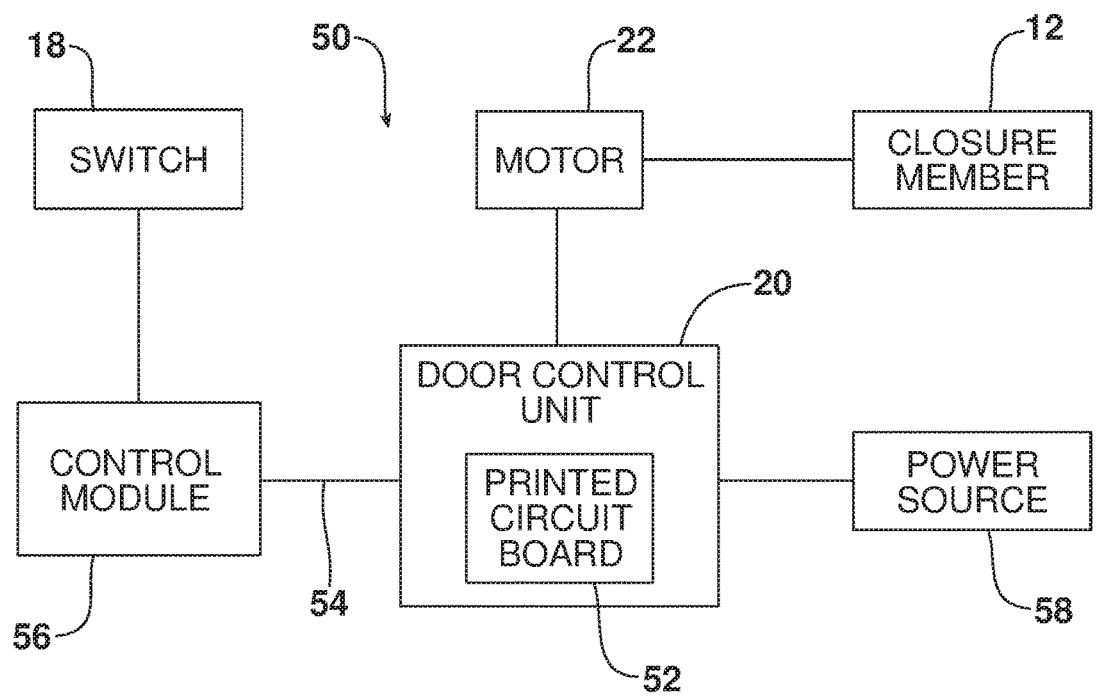
FIG. 4 is a block diagram of an exemplary circuit for controlling a closure member of a vehicle.

FIG. 4 illustrates a block diagram of an exemplary circuit 50 for controlling a closure member (e.g, side window 12) of a vehicle 10. The circuit 50 includes a door control unit 20 mounted in a panel of the side door 16 as is known in the art. In the described embodiment, a printed circuit board (PCB) 52 is supported within the door control unit 20. The door control unit 20 and PCB 52 are connected via a communications network 54 to at least one of a plurality of vehicle control modules. The communications network 54 may be a controller area network (CAN) bus or a local interconnect network (LIN) bus, as is known in the art. The door control unit 20 is connected to a control module 56 which is a body control module in the described embodiment. The control module 56 communicates a state of actuator switch 18 to the door control unit 50. Upon activation of the switch 18, the door control unit 20 via a control circuit 60 on PCB 52 applies power from power source 58 (e.g., a car battery) to the motor 22. As described above, actuation of the motor 22 moves the mechanism 24 supporting the side window 12 between the initial and final positions. The movement is controlled by both the switch 18 and the control circuit 60.

Figure 5:
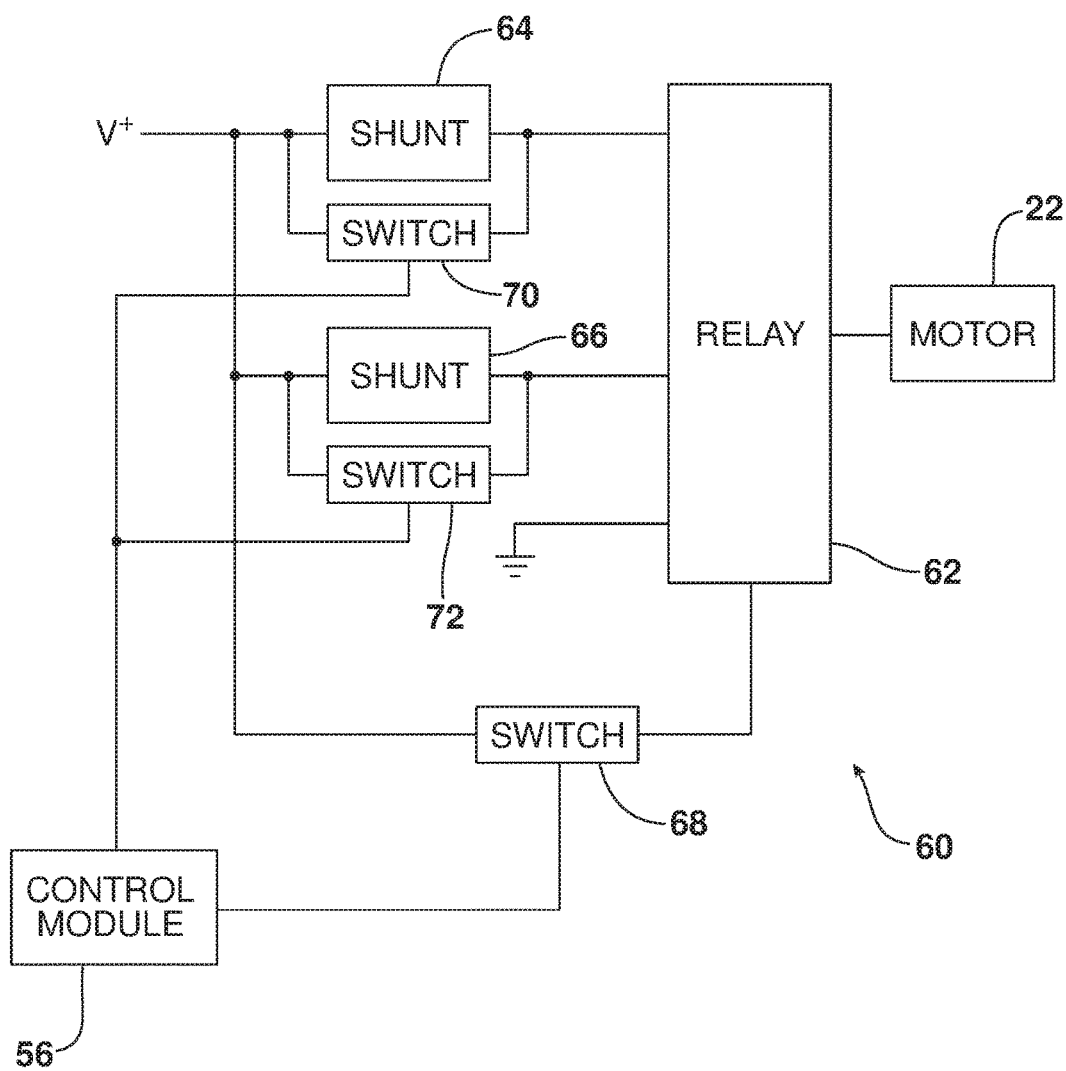
FIG. 5 is a block diagram of an exemplary control circuit for selectively switching first and second shunts to control motor speed and torque.
Figure 6:
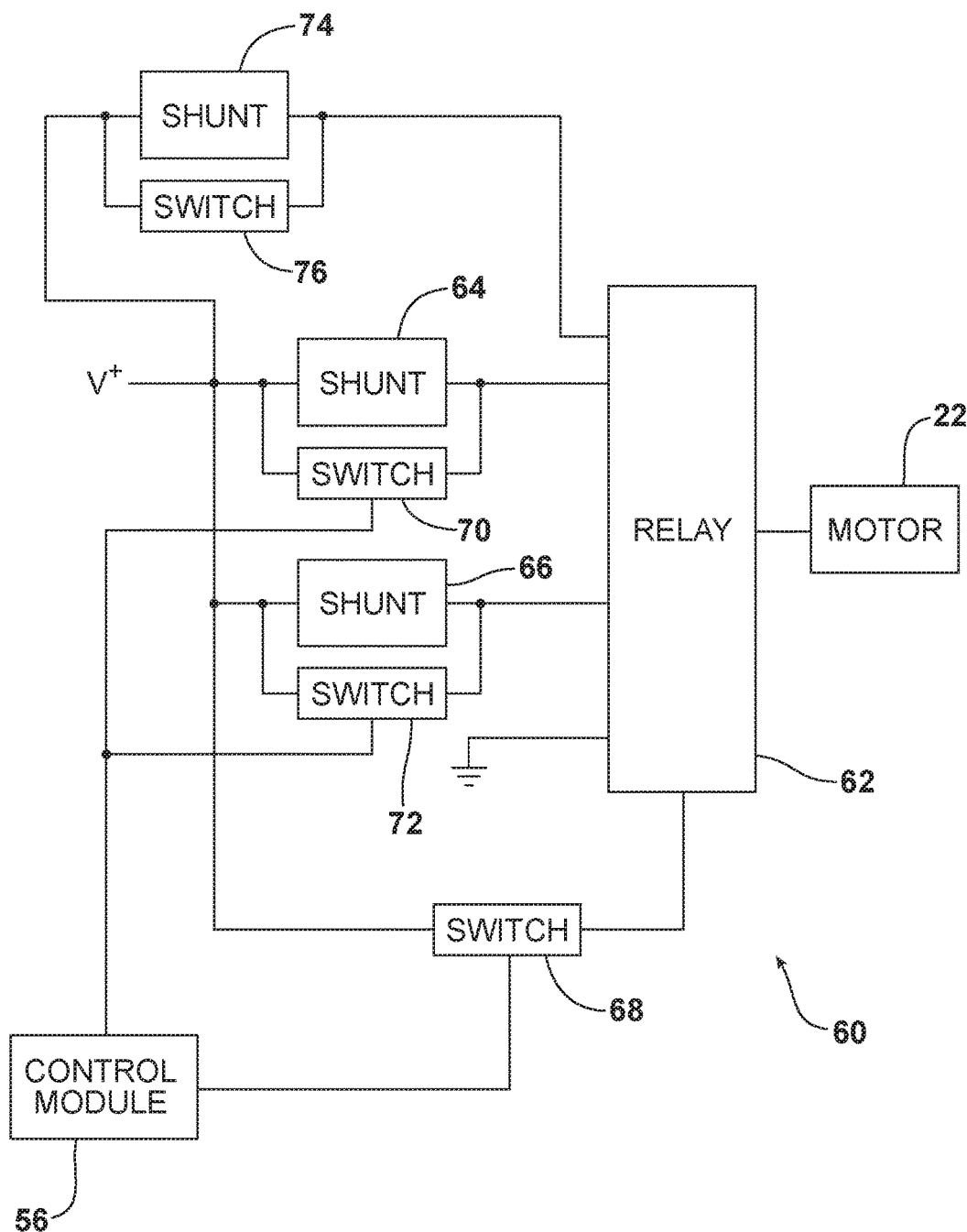
FIG. 6 is a block diagram of an exemplary control circuit for selectively switching First, second, and third shunts to control motor speed and torque.

An exemplary control circuit 60 is shown as a block diagram in FIG. 5. As shown, the control circuit 60 includes a relay 62 for selectively switching a power signal (V+) and a ground signal to the motor 22. In the described embodiment, the relay 62 is a dual pole relay capable of providing the power signal to a first terminal and the ground signal to a second terminal of the motor 22 for rotating the motor in a first direction. For example, the first direction of rotation may cause a closure member such as a side window to move upward. Alternatively, the relay 62 may be operated to provide the power signal to the second terminal and the ground signal to the first terminal of the motor 22 for rotating the motor in a second direction (e.g., a downward movement of a side window). Operation of the relay 62 and control of a direction of movement of the closure member is controlled by switch 68 in response to control module 56. Switch 68, in the described embodiment, includes two PNP transistors for selectively directing the power signal to the first pole or the second pole of the relay 62 in response to a control signal via control module 56.

In addition to switching a direction of rotation of the motor 22, the control circuit 60 is further capable of providing the power signal via a first shunt 64 or a second shunt 66 in order to control the speed of the motor as described above with regard to initial, intermediate, and final positions. More specifically, the control module 56 determines whether power from power source 58 is provided to the relay 62 via the first shunt 64 or the second shunt 66. In the described embodiment, the first shunt 64 and the second shunt 66 are each a metal trace 100 and 102, respectively, having a predetermined value or resistance. As illustrated in FIG. 7 which shows an exemplary printed circuit board 52 having a pair of edge connectors 106 that are well known in the art, the resistance is determined based on a width and thickness of the traces 100, 102 and 104 as is known in the art. The first and second shunts 64, 66 are connected in parallel with a switch 70, 72 such that the respective shunt is effectively removed from the circuit when not in use. In the described embodiment, the switches 70, 72 are each power semiconductor devices (e.g., a metal oxide semiconductor field-effect transistor or MOSFET). The first switch 70 and the second switch 72 receive control signals from the control module 56.

In alternate embodiments, the first and second shunts 64, 66 may be connected in series with switches 70, 72. For instance, when switch 70 is open, first shunt 64 would be effectively removed from the circuit. Similarly, when switch 72 is open, second shunt 66 would be effectively removed from the circuit. Even more, closing both switches 70 and 72 would include both switches in the circuit and could be utilized to provide a third speed option for the closure member. For example, utilizing only the first shunt 64 creates a first resistance associated with a first speed, using only the second shunt 66 creates a second, different resistance associated with a second speed, and utilizing both the first and second shunts creates a third, combined resistance associated with the third speed. In accordance with the invention, any number of shunts could be utilized to create additional speed options used to provide a finer degree of control for the movement of the closure member.

In operation of the present described circuit shown in FIG. 5, the power signal may be directed through the first shunt 64 or the second shunt 66 depending upon a determined initial position of the closure member. In the present described example, a side window 12 is determined to be initially in a closed position. Accordingly, the power signal is directed through the first shunt 64 in a first or a steady state mode of operation initiating movement of the side window 12. As described in detail above, when lowering a side window 12 from a closed position to an open position this arrangement provides a steady speed of the motor and movement of the side window while engaged with a significant amount of the window seal 28.

As the side window 12 moves between the initial position and the final position, the amount of window seal 28 engaged decreases and, at an intermediate position, the power signal may be switched through the second shunt 66 in order to reduce the amount of power directed to the motor 22. Directing the power signal through the second shunt 66 increases an amount of resistance before the motor 22 which reduces both a speed and a torque of the motor. In this example, limiting the speed and torque effectively slows the side window movement at the intermediate point where less seal 28 is engaged allowing the movement to appear more consistent between the initial and final positions. Of course, the control module 56 is capable of switching the first shunt 64 and the second shunt 66 into and out of the control circuit depending upon whether the initial position is an open, a closed, or an intermediary position, and depending on whether the closure member is a side window, a sliding side door, a moonroof, etc.

In this or an alternate embodiment, the control circuit 60 may include a third shunt 74 which may also be a metal trace 104 having a different predetermined value or resistance. The third shunt 74 is likewise connected in parallel with a switch 76 such that the shunt is effectively removed from the circuit when not in use in response to control signals from the control module 56. In this embodiment, the power signal may be switched through the third shunt 74 at a second intermediate position in order to eliminate pinch points.

In one embodiment, the second intermediate position is adjacent a final or closed position and directing the power signal through the third shunt 74 before the motor 22 reduces both a speed and a torque of the motor. Limiting the speed and torque slows the side window movement at the second intermediate point which provides additional time to stop or reverse the side window movement in order to minimize the effects of such pinch points in the event there is an obstruction during a closing procedure. Of course, additional control of the moveable closure movement could be provided by additional shunts in accordance with the above teachings.

In summary, numerous benefits result from the method of controlling a closure member 22 in a vehicle 10 as illustrated in this document. The method is capable of controlling the closure member 22 to ensure steady movement of the closure member between initial and final positions despite retarding forces of seals associated with the closure member and/or to comply with vehicle safety standards at pinch points adjacent a closed position while eliminating the need for pulse width modulation control.

The foregoing has been presented for purposes of illustration and description. It is not intended to be exhaustive or to limit the embodiments to the precise form disclosed. Obvious modifications and variations are possible in light of the above teachings. For example, operation of the sunroof control system can be made without concern of precipitation or whether the doors are locked. All such modifications and variations are within the scope of the appended claims when interpreted in accordance with the breadth to which they are fairly, legally and equitably entitled.

What is claimed is:

1. A circuit for controlling a movable closure member of an automotive vehicle, comprising:
    a motor for driving the movable closure member between an initial position and a final position;
    a first shunt having a first fixed resistance;
    a second shunt having a second, different fixed resistance, wherein said first shunt and said second shunt are traces on a printed circuit board;
    a relay for switching power from said first shunt and said second shunt to said motor;
    a control module connected to said relay for energizing said relay and directing power from said first shunt and said second shunt to said motor dependent upon a position of the movable closure member;
    an actuator switch for activating the movable closure member; and
    a communications network which communicates a state of said actuator switch to said control module.

2. The circuit for controlling the movable closure member of the automotive vehicle of claim 1, further comprising a first switch connected in parallel with said first shunt and a second switch connected in parallel with said second shunt, and wherein said control module is connected to said first switch and said second switch to direct power through said first shunt and said second shunt depending upon the position of the movable closure member.

3. The circuit for controlling the movable closure member of the automotive vehicle of claim 2, wherein said first switch and said second switch are power semiconductor devices.

4. The circuit for controlling the movable closure member of the automotive vehicle of claim 1, further comprising a first switch connected in parallel with said first shunt and a second switch connected in parallel with said second shunt, and wherein said control module is connected to said first switch and said second switch to selectively direct power through said first shunt and said second shunt depending upon the position of the movable closure member.

5. The circuit for controlling the movable closure member of the automotive vehicle of claim 4, wherein the control module selectively directs power through said first shunt when the initial position of the movable closure member is a closed position, and the control module redirects power from the first shunt through said second shunt when the movable closure member is at an intermediate position.

6. The circuit for controlling the movable closure member of the automotive vehicle of claim 4, wherein the control module selectively directs power through said second shunt when the initial position of the movable closure member is an open position, and the control module redirects power from the second shunt through said first shunt when the movable closure member is at an intermediate position.

7. A vehicle incorporating the circuit for controlling a movable closure member of an automotive vehicle of claim 1.

8. A method of controlling a movable closure member of an automotive vehicle, comprising the steps of:
    determining an initial position of the movable closure member;
    initiating movement of the movable closure member;
    switching power between a first shunt having a first fixed resistance and a second shunt having a different fixed resistance when the movable closure member is at a first intermediate position between the initial position and a final position of the movable closure member dependent upon an amount of retarding force acting upon the movable closure member at the first intermediate position;
    determining a subsequent position of the movable closure member; and
    switching power between the second shunt and a third shunt having a third fixed resistance when the subsequent position of the movable closure member is adjacent the final position, wherein the first shunt, the second shunt, and the third shunt are a first trace, a second trace, and a third trace on a printed circuit board.

9. The method of controlling the movable closure member of the automotive vehicle of claim 8, wherein the initiating step includes switching power to the first shunt or the second shunt depending on the initial position of the movable closure member.

10. The method of controlling the movable closure member of the automotive vehicle of claim 8, wherein the initiating step includes initially switching power to the first shunt when the initial position of the movable closure member is determined to be a closed position.

11. The method of controlling the movable closure member of the automotive vehicle of claim 10, wherein the switching step includes switching power from the first shunt to the second shunt when the movable closure member is at the intermediate position.

12. The method of controlling the movable closure member of the automotive vehicle of claim 8, wherein the initiating step includes switching power to the second shunt when the initial position of the movable closure member is determined to be an open position.

13. The method of controlling the movable closure member of the automotive vehicle of claim 12, wherein the switching step includes switching power from the second shunt to the first shunt when the movable closure member is at the intermediate position.

14. The method of controlling the movable closure member of the automotive vehicle of claim 8, wherein the movable closure member is a side door window, a rear gate window, a power sliding door, a sunroof, or a moon roof.

* * * * *